US012753021B2

(12) United States Patent
Jiang et al.

(10) Patent No.: US 12,753,021 B2
(45) Date of Patent: Oct. 6, 2026

(54) FLIPPING DEVICE AND USE METHOD THEREOF, AND FLIPPING METHOD FOR BATTERY MODULE

(71) Applicant: CONTEMPORARY AMPEREX TECHNOLOGY CO., LIMITED, Ningde (CN)

(72) Inventors: Chaoqun Jiang, Ningde (CN); Jifeng Wang, Ningde (CN); Li Xia, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/223,776

(22) Filed: May 30, 2025

(65) Prior Publication Data

US 2025/0289671 A1 Sep. 18, 2025

Related U.S. Application Data

(63) Continuation of application No. PCT/CN2024/109901, filed on Aug. 5, 2024.

(30) Foreign Application Priority Data

Dec. 5, 2023 (CN) ........................ 202311662240.3

(51) Int. Cl.
*B65G 47/24* (2006.01)
*B65G 47/248* (2006.01)

(52) U.S. Cl.
CPC .... *B65G 47/248* (2013.01); *B65G 2201/0223* (2013.01)

(58) Field of Classification Search
CPC .......... B65G 47/248; B65G 2201/0223; B65G 47/252; B65G 47/38; B65G 47/90; B65G 47/902; Y02P 70/50
See application file for complete search history.

(56) References Cited

U.S. PATENT DOCUMENTS 10,644,344 B1 5/2020 Ye et al.
2015/0118002 A1* 4/2015 Yang .................... B65G 47/252 414/759

FOREIGN PATENT DOCUMENTS

CN 214494725 U 10/2021
CN 217436975 U 9/2022
(Continued)

OTHER PUBLICATIONS

The World Intellectual Property Organization (WIPO) International Search Report and Written Opinion for PCT/CN2024/109901 Oct. 23, 2024 17 Pages (including translation).
(Continued)

*Primary Examiner* — Lynn E Schwenning
(74) *Attorney, Agent, or Firm* — ANOVA LAW GROUP, PLLC

(57) ABSTRACT

A flipping device includes a device frame, a lifting mechanism, a flipping mechanism, a first clamping mechanism, and a second clamping mechanism. At least part of the device frame is configured to be arranged beside a conveying line. The lifting mechanism can be lifted and lowered relative to the device frame. The flipping mechanism is rotatably connected to the lifting mechanism. The first clamping mechanism is arranged on the flipping mechanism, and the first clamping mechanism is configured to clamp the first supporting member. The second clamping mechanism is arranged on the flipping mechanism, the second clamping mechanism is configured to clamp the battery module, and the second clamping mechanism is configured to release the clamping to the battery module independently of the first clamping mechanism.

17 Claims, 9 Drawing Sheets

(56) References Cited

FOREIGN PATENT DOCUMENTS

| | | | |
|---|---|---|---|
| CN | 218664013 | U | 3/2023 |
| CN | 116424828 | A | 7/2023 |
| CN | 219468965 | U | 8/2023 |
| CN | 116692461 | A | 9/2023 |
| KR | 20210137338 | A | 11/2021 |

OTHER PUBLICATIONS

The European Patent Office (EPO) The Extended European Search Report for Application No. 248924912 Jul. 3, 2026 8 Pages.

* cited by examiner

FLIPPING DEVICE AND USE METHOD THEREOF, AND FLIPPING METHOD FOR BATTERY MODULE

CROSS-REFERENCE TO RELATED APPLICATIONS

The present application is a continuation of International Application No. PCT/CN2024/109901, filed on Aug. 5, 2024, which claims priority to the Chinese patent application No. 202311662240.3 filed to the China National Intellectual Property Administration on Dec. 5, 2023 and entitled "FLIPPING DEVICE AND USE METHOD THEREOF, AND FLIPPING METHOD FOR BATTERY MODULE", which are incorporated herein by reference in their entirety.

TECHNICAL FIELD

The present application relates to the field of battery production technologies, and in particular, to a flipping device and a use method thereof, and a flipping method for a battery module.

BACKGROUND

After welding and other processes, a battery module needs to be flipped by 180 degrees and transferred to a new pallet. In the related art, a flipping process of a flipping device is relatively complicated and the flipping efficiency needs to be improved.

TECHNICAL SOLUTION

A main objective of the present application is to provide a flipping device aiming to improve the flipping efficiency.

To achieve the above objective, the flipping device proposed in the present application includes a device frame, a lifting mechanism, a flipping mechanism, a first clamping mechanism, and a second clamping mechanism, where at least part of the device frame is configured to be arranged beside a conveying line; the conveying line is configured to convey a to-be-flipped member, the to-be-flipped member includes a first supporting member and a battery module placed on the first supporting member, and the conveying line is further configured to convey a second supporting member to below the to-be-flipped member after the to-be-flipped member is lifted; the lifting mechanism can be lifted and lowered relative to the device frame; the flipping mechanism is rotatably connected to the lifting mechanism; the first clamping mechanism is arranged on the flipping mechanism, and the first clamping mechanism is configured to clamp the first supporting member; the second clamping mechanism is arranged on the flipping mechanism, the second clamping mechanism is configured to clamp the battery module, and the second clamping mechanism is configured to release the clamping to the battery module independently of the first clamping mechanism.

When the flipping device in the technical solution of the present application is in use, at least part of the device frame is configured to be arranged beside the conveying line, which is conducive to reducing the space occupied by the flipping device and improving the process connection efficiency of conveying the battery module and flipping the battery module. The flipping device is capable of first lifting and then flipping the to-be-flipped member including the battery module by the lifting mechanism and the flipping mechanism, which is conducive to reducing the risk of the to-be-flipped member colliding with the device frame or the conveying line in the flipping process. The second clamping mechanism is configured to release the clamping to the battery module independently of the first clamping mechanism, which is conducive to flipping and resetting the first supporting member while conveying the battery module and the second supporting member by the conveying line, thereby being conducive to improving the flipping efficiency.

Optionally, the flipping mechanism includes a flipping drive mechanism and a driven mechanism arranged at an interval, the flipping drive mechanism and the driven mechanism are respectively rotatably connected to the lifting mechanism, and a rotation axis of the flipping drive mechanism is colinear with a rotation axis of the driven mechanism.

Optionally, the first clamping mechanism includes a first clamping assembly and a second clamping assembly, the first clamping assembly and the second clamping assembly are arranged at an interval in a first direction, the first direction is parallel to a flipping plane of the flipping mechanism, and the first clamping assembly and the second clamping assembly are respectively configured to clamp two opposite sides of the first supporting member in a height direction.

Optionally, the second clamping mechanism includes a third clamping assembly and a fourth clamping assembly, the third clamping assembly and the fourth clamping assembly are arranged in a second direction, and the second direction is parallel to a flipping axis of the flipping mechanism.

At this point, the flipping mechanism includes the flipping drive mechanism and the driven mechanism arranged at an interval, which increases flipping support points of the flipping mechanism, and is conducive to improving the stability of the flipping mechanism during flipping. The first clamping assembly and the second clamping assembly are capable of being configured to clamp two opposite sides of the first supporting member in the height direction, which is conducive to improving the stability of the clamping to the first supporting member. The third clamping assembly and the fourth clamping assembly are capable of increasing clamping action points of the battery module, which is conducive to improving the stability of the clamping to the battery module.

Optionally, the device frame is provided with a rack, and the rack is arranged to extend in a vertical direction. The lifting mechanism includes a lifting drive apparatus and a gear, an output shaft of the lifting drive apparatus is connected to the gear, and the gear is meshed with the rack.

At this point, when the lifting drive apparatus outputs power, the lifting mechanism is capable of being lifted and lowered relative to the device frame by the meshing of the gear and the rack, thereby improving the lifting stability of the lifting mechanism. The rack is arranged on the device frame and the gear is arranged on the lifting mechanism, which is conducive to reducing the weight of the lifting mechanism and conducive to reducing the power consumption of the lifting mechanism during lifting and lowering.

Optionally, the flipping device further includes a conveying line. The device frame has a through space that penetrates the device frame in a horizontal direction, and the conveying line passes through the through space in the horizontal direction. The lifting mechanism, the flipping mechanism, the first clamping mechanism, and the second clamping mechanism are respectively arranged in the through space.

At this point, the conveying line passes through the through space in the horizontal direction, so that the battery module is capable of being flipped inside the flipping device and transferred from the first supporting member to the second supporting member, thereby reducing the overall footprint of the flipping and transplanting processes. The lifting mechanism, the flipping mechanism, the first clamping mechanism, and the second clamping mechanism are respectively arranged in the through space, which is conducive to improving the compactness of the flipping device.

Optionally, the flipping device further includes a counterweight structure and a flexible connecting element, and two ends of the flexible connecting element are respectively connected to the counterweight structure and the lifting mechanism. The flexible connecting element is higher in the middle and lower at both ends, and at least part of the flexible connecting element abuts against at least part of an upper side of the device frame.

At this point, the counterweight structure is capable of reducing a driving torque of the lifting drive apparatus by the flexible connecting element, which is conducive to improving the lifting efficiency and lifting stability of the battery module on the lifting mechanism.

Optionally, the device frame includes an upper connecting frame, a lower connecting frame, and at least two connecting columns. The upper connecting frame and the lower connecting frame are arranged opposite to each other in the vertical direction, and two ends of the connecting columns are respectively connected to the upper connecting frame and the lower connecting frame. The upper connecting frame, the lower connecting frame, and the connecting columns form the through space, and part of the upper connecting frame abuts under the flexible connecting element.

At this point, the device frame includes the upper connecting frame, the lower connecting frame, and the at least two connecting columns, which is conducive to reducing material consumption and is capable of increasing activity space for other components such as the flexible connecting element and the conveying line, thereby being conducive to improving space utilization of the flipping device.

Optionally, the flipping device further includes the conveying line and a blocking mechanism, the blocking mechanism is configured to block the to-be-flipped member located on the conveying line or to block the second supporting member located on the conveying line, and the blocking mechanism can be lifted and lowered relative to the conveying line.

At this point, the blocking mechanism is capable of positioning the to-be-flipped member or the second supporting member in a conveying direction, which reduces the risk of the to-be-flipped member or the second supporting member being conveyed beyond a preset position, thereby being conducive to improving the position accuracy of gripping the to-be-flipped member or placing the battery module on the second supporting member.

Optionally, the flipping mechanism is configured to flip the lifted to-be-flipped member in a first rotational direction. The flipping mechanism is further configured to flip the lifted first supporting member in a second rotational direction after the second supporting member carries the battery module, and the second rotational direction is opposite to the first rotational direction.

At this point, when the flipping device in the technical solution is in use, it is capable of reducing the risk of connecting pipelines of the first clamping mechanism, the second clamping mechanism, and other mechanisms to be entangled with the counterweight structure, the lower connecting frame, and other structures, thereby reducing the risk of unstable flipping caused by entanglement of pipelines.

The present application further provides a use method of a flipping device. The use method is applied to the flipping device described above, and the use method includes the following steps:

- clamping the to-be-flipped member by the first clamping mechanism and the second clamping mechanism;
- lifting the to-be-flipped member by the lifting mechanism;
- flipping the lifted to-be-flipped member by the flipping mechanism;
- placing the second supporting member below the lifted to-be-flipped member;
- lowering the battery module relative to the second supporting member by the lifting mechanism; and
- maintaining the clamping of the first clamping mechanism to the first supporting member and releasing the clamping of the second clamping mechanism to the battery module, and making the second supporting member to carry the battery module.

When the flipping device is used according to the use method of the present application, the flipping device is capable of first lifting and then flipping the to-be-flipped member including the battery module by the lifting mechanism and the flipping mechanism, which is conducive to reducing the risk of the to-be-flipped member colliding with the device frame or the conveying line in the flipping process. The clamping of the first clamping mechanism to the first supporting member is maintained and the clamping of the second clamping mechanism to the battery module is released, which is conducive to flipping and resetting the first supporting member while conveying the battery module and the second supporting member by the conveying line, thereby being conducive to improving the flipping efficiency.

Optionally, the step of lowering the battery module relative to the second supporting member includes:

- lowering the battery module and the first supporting member synchronously relative to the second supporting member.

At this point, the battery module and the first supporting member are lowered synchronously relative to the second supporting member, which is conducive to reducing the complexity of the process of lowering the battery module and the first supporting member.

Optionally, after the step of maintaining the clamping of the first clamping mechanism to the first supporting member and releasing the clamping of the second clamping mechanism to the battery module, and making the second supporting member to carry the battery module, the use method further includes the following steps:

- lifting the first supporting member by the lifting mechanism;
- flipping the lifted first supporting member by the flipping mechanism; and
- lowering the flipped first supporting member by the lifting mechanism.

At this point, the first supporting member is capable of being flipped and reset after the battery module is detached, and the first supporting member is capable of continuing to be configured to carry a new battery module, which is conducive to improving the use efficiency of the first supporting member.

Optionally, the step of flipping the lifted to-be-flipped member includes: flipping the lifted to-be-flipped member in the first rotational direction; and the step of flipping the lifted first supporting member includes: flipping the lifted first supporting member in the second rotational direction, where the second rotational direction is opposite to the first rotational direction.

At this point, the second rotational direction is opposite to the first rotational direction, which is conducive to reducing a cumulative error of the flipping process and improving the repeated position accuracy of the flipping process.

The present application further proposes a flipping method for a battery module, and the flipping method includes the following steps:

placing the battery module on a first supporting member, where the first supporting member and the battery module form a to-be-flipped member;
clamping the to-be-flipped member;
lifting the to-be-flipped member;
flipping the lifted to-be-flipped member;
placing a second supporting member below the lifted to-be-flipped member;
lowering the battery module relative to the second supporting member; and
maintaining the clamping to the first supporting member and releasing the clamping to the battery module, and making the second supporting member to carry the battery module.

When the flipping method of the present application is used to flip the battery module, the clamping to the first supporting member is maintained and the clamping to the battery module is released, and the second supporting member is made to carry the battery module, which is conducive to flipping and resetting the first supporting member while the battery module and the second supporting member are conveyed through a conveying line, thereby being conducive to improving the flipping efficiency.

The above description is only an overview of the technical solution of the present application. In order to better understand the technical means of the present application and thus implement them according to the contents of the specification, and in order to make the aforementioned and other objectives, features, and advantages of the present application more obvious and understandable, a detailed description of the present application is given hereinafter.

DESCRIPTION OF DRAWINGS

To describe the technical solutions in the embodiments of the present application more clearly, the following briefly introduces the accompanying drawings required for describing the embodiments. Apparently, the accompanying drawings described in the following are merely some embodiments in the present application, and a person of ordinary skill in the art may still derive other drawings from structures shown by these accompanying drawings without creative efforts.

LIST OF REFERENCE NUMERALS

Figure 1:
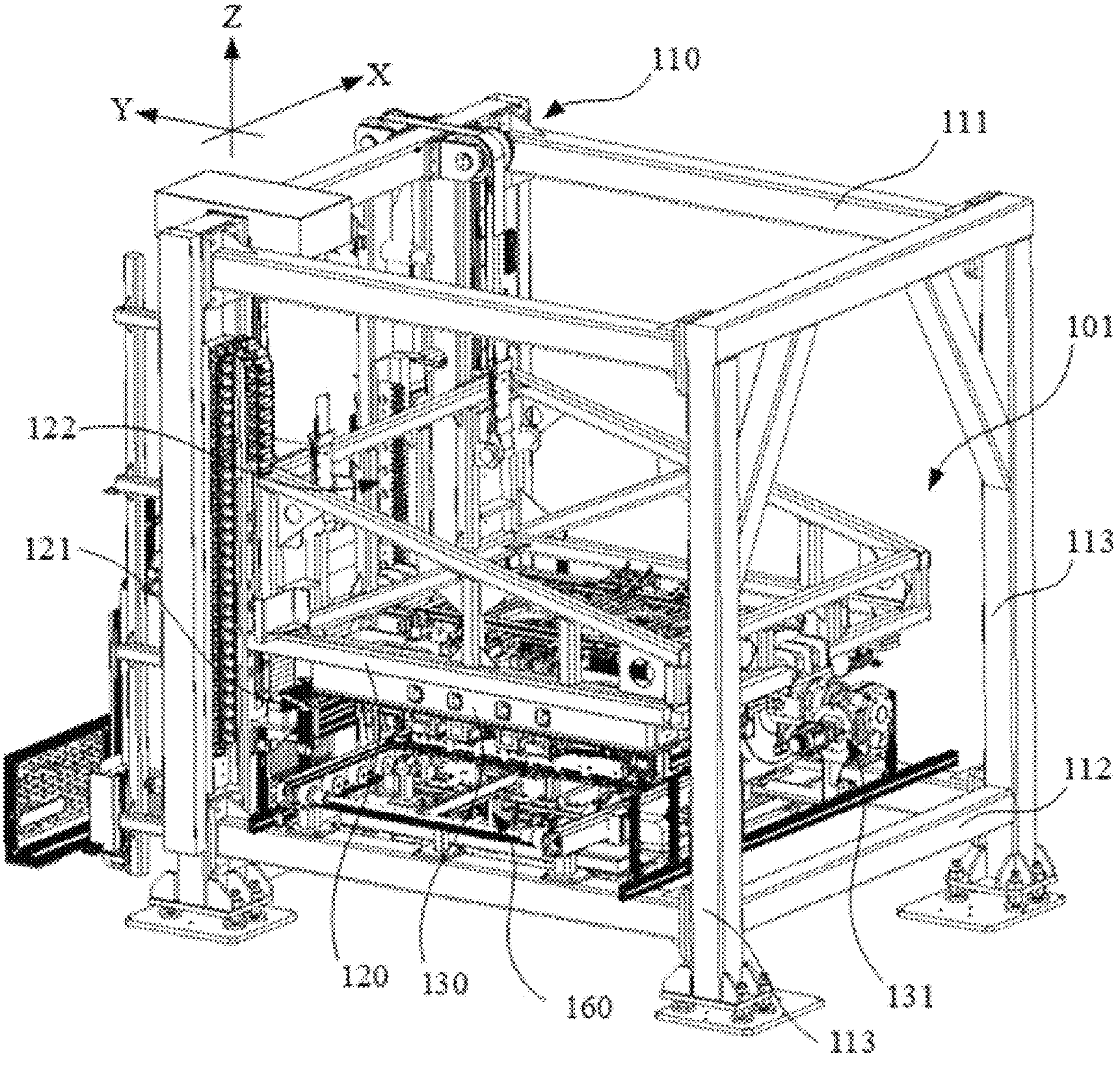
FIG. 1 is a schematic three-dimensional structural diagram of an embodiment of a flipping device according to the present application.
Figure 2:
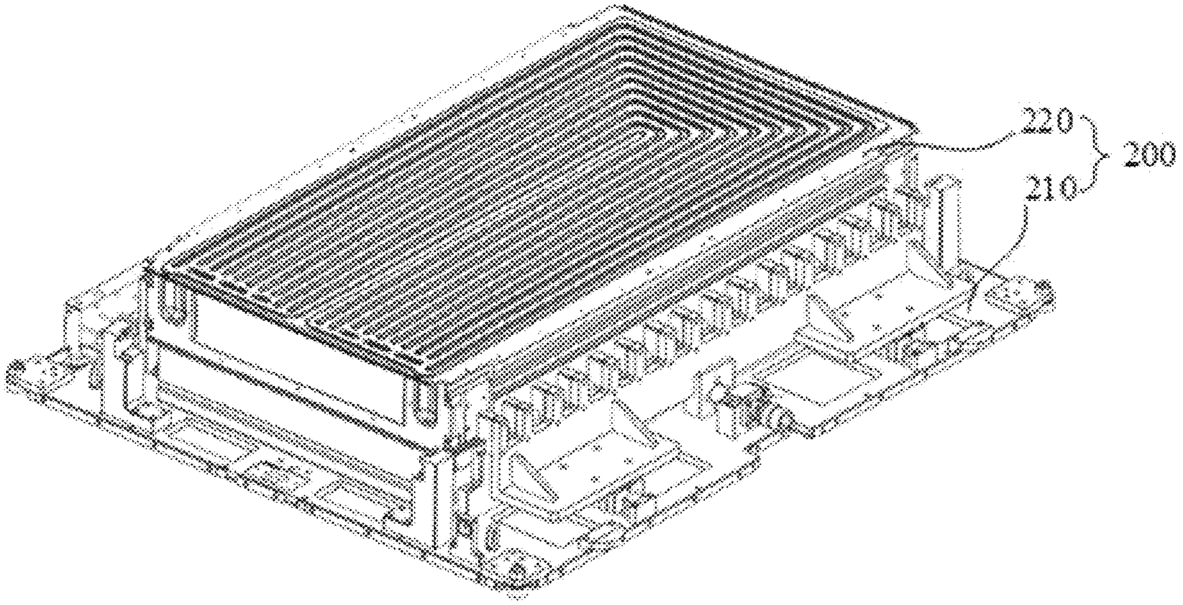
FIG. 2 is a schematic structural diagram of a to-be-flipped member corresponding to an embodiment of a flipping device according to the present application.
Figure 3:
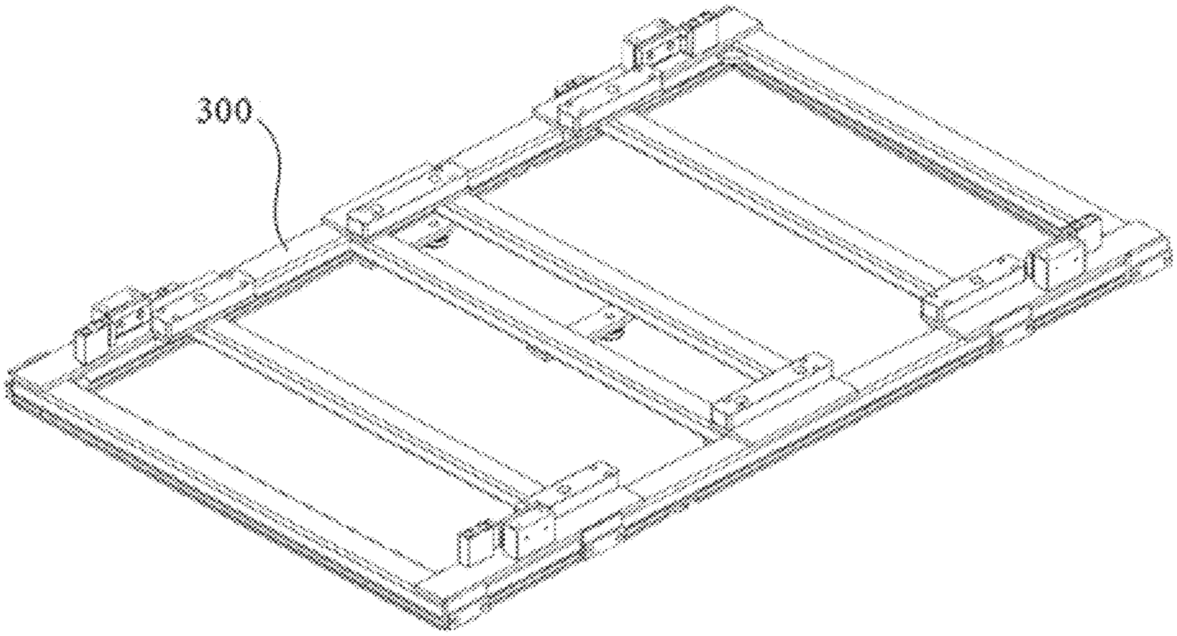
FIG. 3 is a schematic structural diagram of a second supporting member corresponding to an embodiment of a flipping device according to the present application.

| Reference numerals | Name |
|---|---|
| 101 | Through space |
| 110 | Device frame |
| 111 | Upper connecting frame |
| 112 | Lower connecting frame |
| 113 | Connecting column |
| 120 | Lifting mechanism |
| 121 | Lifting drive apparatus |
| 122 | Rack |
| 130 | Flipping mechanism |
| 131 | Flipping drive mechanism |
| 132 | Driven mechanism |
| 140 | First clamping mechanism |
| 141 | First clamping assembly |
| 142 | Second clamping assembly |
| 150 | Second clamping mechanism |
| 151 | Third clamping assembly |
| 152 | Fourth clamping assembly |
| 160 | Conveying line |
| 161 | Blocking mechanism |
| 171 | Counterweight structure |
| 172 | Flexible connecting element |
| 200 | To-be-flipped member |
| 210 | First supporting member |
| 220 | Battery module |
| 300 | Second supporting member |

The implementation of the objective, functional features, and advantages of the present application will be further described in combination with embodiments and with reference to the accompanying drawings.

DETAILED DESCRIPTION OF EMBODIMENTS OF THE PRESENT APPLICATION

The technical solutions in the embodiments of the present application will be clearly and completely described below with reference to the accompanying drawings of the embodiments of the present application. Apparently, the embodiments described are merely some rather than all of the embodiments of the present application. Based on the embodiments of the present application, all other embodiments derived by a person of ordinary skill in the art without any creative effort shall all fall within the protection scope of the present application.

It should be noted that if there is a directional indication (such as up, down, left, right, front, and back) in the embodiments of the present application, the directional indication is only used to explain a relative positional relationship and a movement condition between components in a specific posture, and when the specific posture changes, the directional indication also changes accordingly.

In addition, if descriptions involving "first", "second", and the like are involved in the present application, the descriptions of "first", "second", and the like are used for description only and cannot be construed as indicating or implying relative importance thereof or implicitly indicating the quantity of technical features indicated. Therefore, the features defined with "first" and "second" may explicitly or implicitly include at least one of the features. In addition, the meaning of "and/or" throughout the text includes three parallel solutions. Taking "A and/or B" as an example, it includes a solution A, a solution B, or a solution meeting both A and B. In addition, the technical solutions of the various embodiments may be combined with each other, but should be based on what is capable of being implemented by those of ordinary skill in the art. When a combination of technical solutions is contradictory or cannot be implemented, it should be considered that the combination of technical solutions does not exist, and is not within the protection scope of the present application.

After welding and other processes, a battery module needs to be flipped by 180 degrees and transferred to a new pallet. In the related art, a flipping process of a flipping device is relatively complicated and the flipping efficiency needs to be improved.

Therefore, based on the above considerations, in order to improve the flipping efficiency, the present application proposes a flipping device. When the flipping device is in use, it is capable of enabling a second clamping mechanism to release clamping to the battery module independently of a first clamping mechanism, which is conducive to flipping and resetting a first supporting member while conveying the battery module and a second supporting member through a conveying line, so as to improve the flipping efficiency.

Next, the structure of the flipping device proposed in the present application is explained with a specific embodiment.

In one embodiment of the present application, referring to FIG. 1, FIG. 2, FIG. 3, and FIG. 4, the flipping device includes a device frame 110, a lifting mechanism 120, a flipping mechanism 130, a first clamping mechanism 140, and a second clamping mechanism 150. At least part of the device frame 110 is configured to be arranged beside a conveying line 160. The conveying line 160 is configured to convey a to-be-flipped member 200. The to-be-flipped member 200 includes a first supporting member 210 and a battery module 220 placed on the first supporting member 210. The conveying line 160 is further configured to convey a second supporting member 300 to below the to-be-flipped member 200 after the to-be-flipped member 200 is lifted. The lifting mechanism 120 can be lifted and lowered relative to the device frame 110. The flipping mechanism 130 is rotatably connected to the lifting mechanism 120. The first clamping mechanism 140 is arranged on the flipping mechanism 130, and the first clamping mechanism 140 is configured to clamp the first supporting member 210. The second clamping mechanism 150 is arranged on the flipping mechanism 130, the second clamping mechanism 150 is configured to clamp the battery module 220, and the second clamping mechanism 150 is configured to release the clamping to the battery module 220 independently of the first clamping mechanism 140.

The device frame 110 may be understood as a frame structure for connecting to a work site. For example, the device frame 110 may be connected to the work site by fasteners such as bolts. The conveying line 160 may be arranged as a conveyor belt or conveyor rollers. The conveying line 160 may be arranged to convey in an X direction in the figure, including conveying the above to-be-flipped member 200, the second supporting member 300, and the like. When the conveying line 160 is arranged as conveyor rollers, the rollers may be arranged at intervals. At least part of the device frame 110 is configured to be set beside the conveying line 160, which may be understood as that the device frame 110 is not suspended above the conveying line 160. For example, connecting columns 113 of the device frame 110 may be arranged beside the conveying line 160, for example, the connecting columns 113 are arranged beside the conveying line 160 in a direction Y in the figure; or the connecting columns 113 are passed through the conveying line 160 with intervals, such as through the intervals between the above conveyor rollers, thereby further improving the space utilization. In this case, it is understandable that part of the device frame 110 is arranged beside part of the conveying line 160.

The lifting mechanism 120 may be understood as a mechanism capable of being lifted and lowered relative to the device frame 110, for example, relatively lifted and lowered in a direction Z in the figure. The lifting mechanism 120 may be lifted and lowered relative to the device frame 110 by a gear rack mechanism, a worm gear mechanism, a rope, or another mechanism, which is not limited in this embodiment. The flipping mechanism 130 may be understood as a mechanism capable of flipping by being rotatably connected to the lifting mechanism 120. The first clamping mechanism 140 and the second clamping mechanism 150 may be understood as mechanisms capable of clamping, for example, a mechanism such as a clamping jaw. The first supporting member 210 and the second supporting member 300 may be understood as structural members capable of supporting the battery module 220, and may be configured as a structure such as a pallet or a portable fixture.

When the flipping device in the technical solution of the present application is in use, at least part of the device frame 110 is configured to be arranged beside the conveying line 160, which is conducive to reducing the space occupied by the flipping device and improving the process connection efficiency of conveying the battery module 220 and flipping the battery module 220. The flipping device is capable of first lifting and then flipping the to-be-flipped member 200 including the battery module 220 by the lifting mechanism 120 and the flipping mechanism 130, which is conducive to reducing the risk of the to-be-flipped member 200 colliding with the device frame 110 or the conveying line 160 in the flipping process. The second clamping mechanism 150 is configured to release the clamping to the battery module 200 independently of the first clamping mechanism 140, which is conducive to flipping and resetting the first supporting member 210 while conveying the battery module 220 and the second supporting member 300 by the conveying line 160, thereby being conducive to improving the flipping efficiency.

Specifically, when the flipping device is used, the to-be-flipped member 200 including the first supporting member 210 and the battery module 220 may be first conveyed to a preset position by the conveying line 160. The first supporting member 210 and the battery module 220 may be clamped respectively by the first clamping mechanism 140 and the second clamping mechanism 150. The to-be-flipped member 200 is then lifted to a preset height by the lifting mechanism 120, and the to-be-flipped member 200 is flipped by 180 degrees by the flipping mechanism 130, so that the first supporting member 210 is on the top and the battery module 220 is on the bottom. After flipping, the first supporting member 210 and the battery module 220 are lowered by the lifting mechanism 120, and at the same time, the second supporting member 300 may be conveyed by the conveying line 160, so as to support the lowered battery module 220 by the second supporting member 300. Then, the second clamping mechanism 150 is independent of the first clamping mechanism 140 to release the clamping to the battery module 220, and the battery module 220 is capable of being supported on the second supporting member 300 and being output together with the second supporting member 300 by the conveying line 160. At the same time, the first supporting member 210 clamped by the first clamping mechanism 140 is capable of passing through the lifting mechanism 120 and the flipping mechanism 130, and performing processes of lifting, flipping and resetting, and lowering to the conveying line 160 in sequence, so that the first supporting member 210 is capable of flowing out of the conveying line 160 and being configured to support a new battery module 220.

The various processes such as conveying the to-be-flipped member 200 to a preset position, clamping the first supporting member 210 and the battery module 220, lifting the to-be-flipped member 200 to a preset height, flipping the to-be-flipped member 200, lowering the first supporting member 210 and the battery module 220, releasing the clamping to the battery module 220 by the second clamping mechanism 150 independently of the first clamping mechanism 140, outputting the battery module 220 by the conveying line 160, lifting the first supporting member 210 after the battery module 220 is detached, flipping and resetting the first supporting member 210 after the battery module 220 is detached, releasing the clamping to the first supporting member 210 by the first clamping mechanism 140, and conveying the first supporting member 210 after the battery module 220 is detached by the conveying line 160 may be connected by a preset timing, that is, the various processes are performed sequentially at a preset time interval to reduce the use of sensors and reduce the overall material cost of the flipping device.

Figure 4:
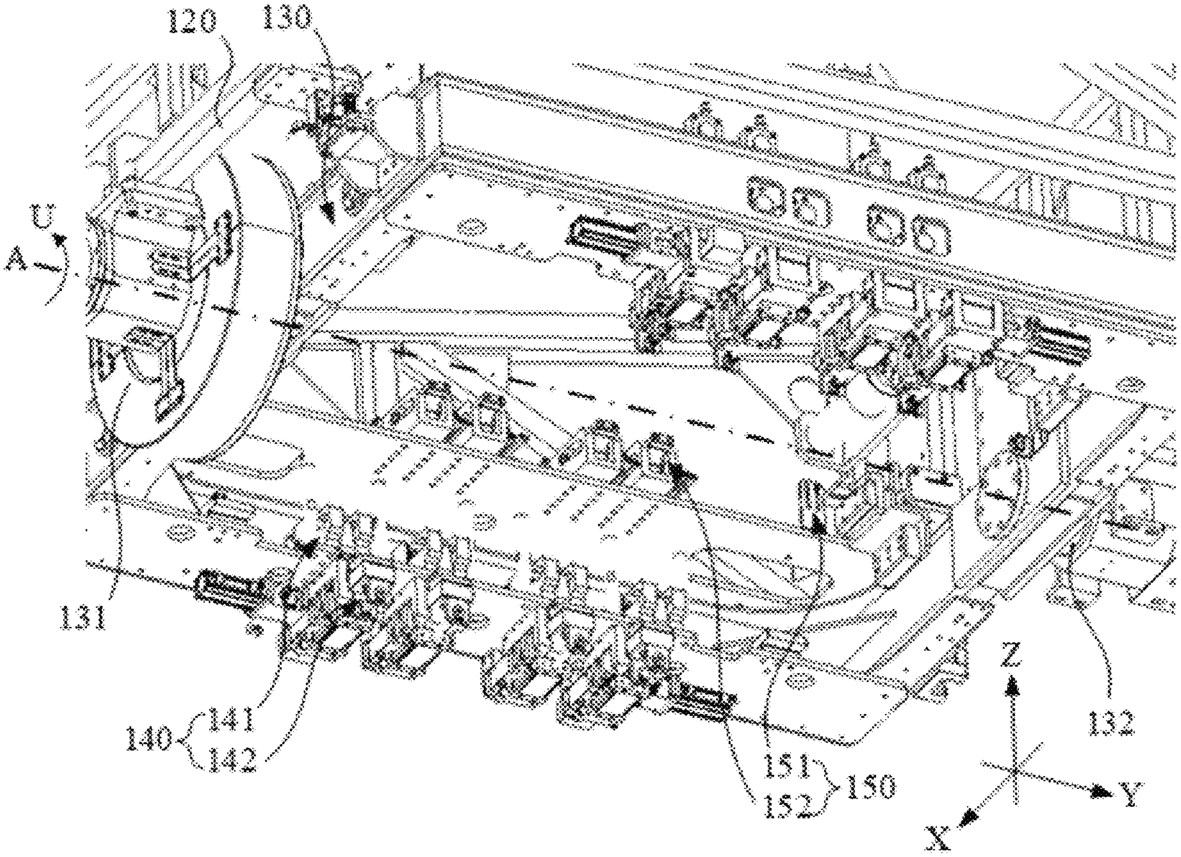
FIG. 4 is a schematic partial structural diagram of an embodiment of a flipping device according to the present application.

In some embodiments, referring to FIG. 4, the flipping mechanism 130 includes a flipping drive mechanism 131 and a driven mechanism 132 that are arranged at an interval. For example, the flipping drive mechanism 131 and the driven mechanism 132 are arranged at an interval in the direction Y in the figure. The flipping drive mechanism 131 and the driven mechanism 132 are respectively rotatably connected to the lifting mechanism 120, and a rotation axis of the flipping drive mechanism 131 is colinear with a rotation axis of the driven mechanism 132. For example, the rotation axis of the flipping drive mechanism 131 and the rotation axis of the driven mechanism 132 are both arranged on an axis A in the figure.

The flipping drive mechanism 131 may be understood as a mechanism capable of driving the flipping mechanism 130 to flip. The flipping drive mechanism 131 is configured as a driving motor, a driving cylinder, and the like, and drives the flipping mechanism 130 to flip through gear meshing, rope transmission, and the like. The driven mechanism 132 may be understood as a mechanism that is driven when the flipping mechanism 130 flips, so as to improve the flipping smoothness of the flipping mechanism 130. The driven mechanism 132 is usually not provided with a power output mechanism, so as to reduce the component cost of the flipping mechanism 130. The flipping drive mechanism 131 and the driven mechanism 132 are respectively rotatably connected to the lifting mechanism 120. It is understandable that at least part of the flipping drive mechanism 131 and at least part of the driven mechanism 132 are capable of rotating relative to the lifting mechanism 120.

In this embodiment, the flipping mechanism 130 includes the flipping drive mechanism 131 and the driven mechanism 132 arranged at an interval, thereby increasing the flipping support points of the flipping mechanism 130 and facilitating improving the stability of the flipping mechanism 130 when flipping.

In some embodiments, referring to FIG. 4, the first clamping mechanism 140 includes a first clamping assembly 141 and a second clamping assembly 142. The first clamping assembly 141 and the second clamping assembly 142 are arranged at an interval in a first direction Z. The first direction Z is parallel to a flipping plane of the flipping mechanism 130. The flipping plane may be set to a plane where a rotational direction U in the figure is located. It is understandable that the flipping plane is set to the plane where the rotational direction of the flipping mechanism 130 is located. The first clamping assembly 141 and the second clamping assembly 142 are respectively configured to clamp two opposite sides of the first supporting member 210 in the height direction.

The first clamping assembly 141 and the second clamping assembly 142 included in the first clamping mechanism 140 may be understood as assemblies for clamping the first supporting member 210 respectively.

In this embodiment, the first clamping assembly 141 and the second clamping assembly 142 are capable of being configured to clamp two opposite sides of the first supporting member 210 in the height direction, which is conducive to improving the stability of the clamping to the first supporting member 210.

In some embodiments, the second clamping mechanism 150 includes a third clamping assembly 151 and a fourth clamping assembly 152. The third clamping assembly 151 and the fourth clamping assembly 152 are arranged in a second direction Y, and the second direction Y is parallel to a flipping axis A of the flipping mechanism 130.

The third clamping assembly 151 and the fourth clamping assembly 152 included in the second clamping mechanism 150 may be understood as assemblies for clamping the battery module 220 respectively.

In this embodiment, the third clamping assembly 151 and the fourth clamping assembly 152 are capable of increasing clamping action points for the battery module 220, which is conducive to improving the stability of the clamping to the battery module 220.

Figure 5:
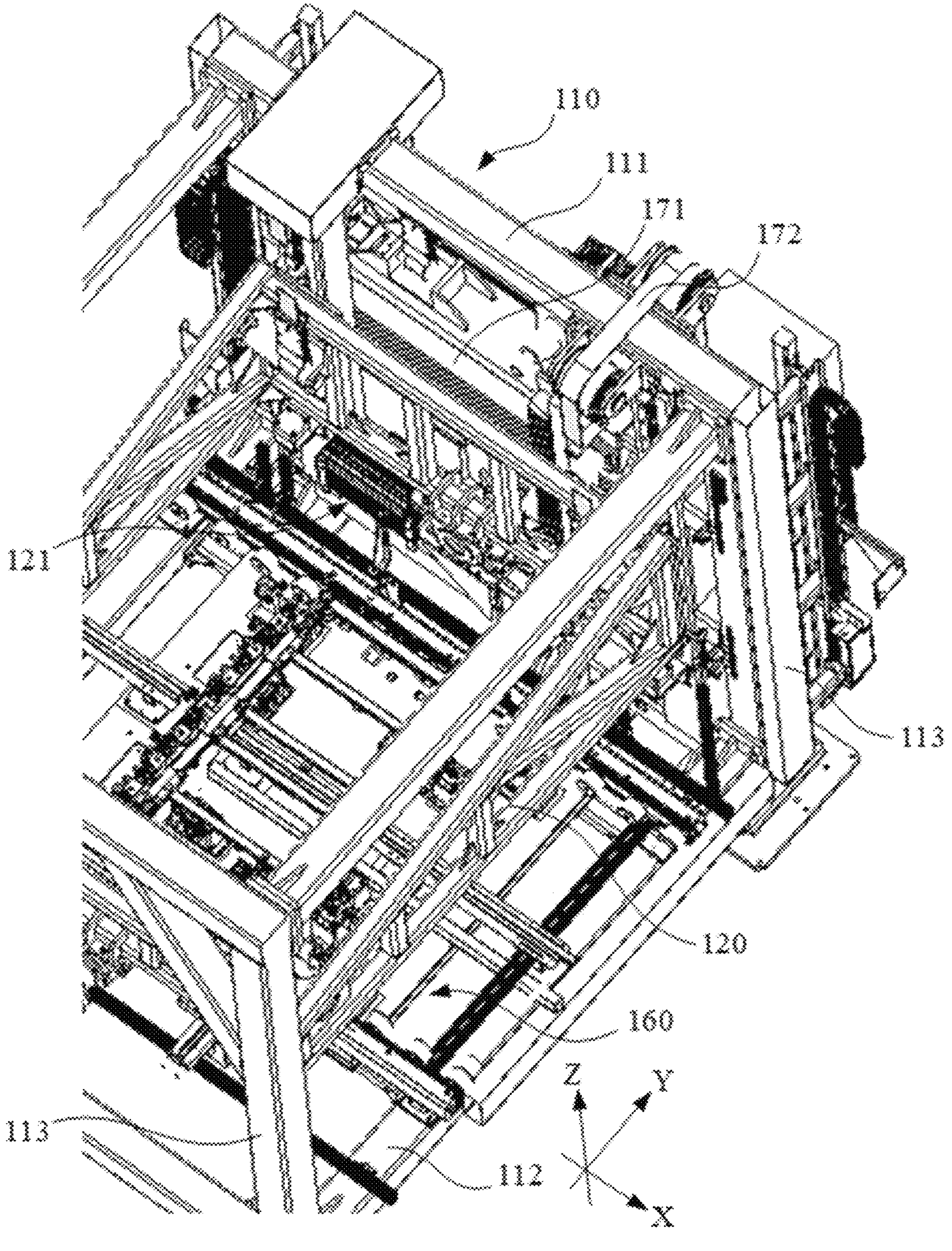
FIG. 5 is another schematic partial structural diagram of an embodiment of a flipping device according to the present application.

In some embodiments, referring to FIG. 1, the device frame 110 is provided with a rack 122, and the rack 122 is arranged to extend in the vertical direction. Referring to FIG. 1 and FIG. 5, the lifting mechanism 120 includes a lifting drive apparatus 121 and a gear, an output shaft of the lifting drive apparatus 121 is connected to the gear, and the gear is meshed with the rack 122. The flipping device in FIG. 1 and FIG. 5 is provided with two sets of rack 122, gear, and lifting drive apparatus 121, and the two sets of rack 122, gear, and lifting drive apparatus 121 are arranged at an interval to improve the lifting stability. The two groups of rack 122, gear, and lifting drive apparatus 121 are arranged at an interval in a direction parallel to the flipping plane of the flipping mechanism 130, thereby improving the force balance of each group of rack 122, gear, and lifting drive apparatus 121, and increasing the fatigue life of the rack 122, gear, and lifting drive apparatus 121 under multiple uses. For example, referring to FIG. 1 and FIG. 4, the flipping plane of the flipping mechanism 130 is parallel to an XZ plane, and the two sets of rack 122, gear, and lifting drive apparatus 121 are arranged at an interval in an X-axis direction. It is understandable that the two sets of rack 122, gear, and lifting drive apparatus 121 may be further arranged to be arranged in a horizontal direction.

The rack 122 is extended in the vertical direction, which may be understood as a length direction of the rack 122 is arranged in the vertical direction, and connecting teeth of the rack 122 are arranged in sequence in the vertical direction. The lifting drive apparatus 121 may be understood as an apparatus that outputs the power required for lifting when the lifting mechanism 120 is lifted and lowered. The lifting drive apparatus 121 may be set as a rotating motor or another apparatus.

In this embodiment, when the lifting drive apparatus 121 outputs power, the lifting mechanism 120 is capable of being lifted and lowered relative to the device frame 110 by the meshing of the gear and the rack 122, thereby improving the lifting stability of the lifting mechanism 120. The rack 122 is arranged on the device frame 110 and the gear is arranged on the lifting mechanism 120, which is conducive to reducing the weight of the lifting mechanism 120 and reducing the power consumption of the lifting mechanism 120 during lifting.

Further, the rotation axis A of the flipping mechanism 130 is arranged between the two racks 122, and an extension direction of connecting teeth of the racks 122 is parallel to the flipping plane of the flipping mechanism 130. In this implementation, relative to the extension direction of each connecting tooth of the rack being perpendicular to the flipping plane of the flipping mechanism 130, the extension direction of each connecting tooth of the rack 122 is parallel to the flipping plane of the flipping mechanism 130, so that the connecting teeth beside the rotation axis A of the flipping mechanism 130 are capable of bearing, in the extension direction, the flipping torque caused by the flipping of the flipping mechanism 130, thereby further improving the fatigue life of the rack 122, the gear, and the lifting drive apparatus 121 under multiple uses.

In some embodiments, referring to FIG. 1, the flipping drive mechanism 131 is arranged on the side away from the rack 122. In addition, the driven mechanism 132 is arranged on the side facing the rack 122. It is understandable that since the flipping drive mechanism 131 is set as a driving motor, a driving cylinder, and the like, its weight is relatively heavy relative to the driven mechanism 132, and it is needed to connect the driving motor, the driving cylinder, and the like with electric wires or connecting lines such as hydraulic and pneumatic connecting lines. The flipping drive mechanism 131 is arranged on one side away from the rack 122. It is understandable that the flipping drive mechanism 131 is farther away from the rack 122 than the driven mechanism 132. Therefore, when the to-be-flipped member 200, the flipping mechanism 130, and part of the lifting mechanism 120 are lifted or lowered by the lifting drive apparatus 121, the gear, and the rack 122, the lifting stability is improved by the relatively distant and relatively heavy flipping drive mechanism 131, and the risk of mutual interference between the connecting line of the flipping drive mechanism 131 and the transmission mechanism such as the rack 112 is reduced.

In some embodiments, referring to FIG. 1, the flipping device further includes a conveying line 160. The device frame 110 has a through space 101 that penetrates the device frame 110 in the horizontal direction. For example, the through space 101 penetrates the device frame 110 in the Y direction in the figure. The conveying line 160 passes through the through space 101 in the horizontal direction. For example, the conveying line 160 passes through the through space 101 in the Y direction in the figure. The lifting mechanism 120, the flipping mechanism 130, the first clamping mechanism 140, and the second clamping mechanism 150 are respectively arranged in the through space 101.

The through space 101 may be understood as a space penetrating the device frame 110. The conveying line 160 passing through the through space 101 may be understood as two ends of the conveying line 160 extending out of the through space 101, respectively.

In the embodiment, the conveying line 160 passes through the through space 101 in the horizontal direction, so that the battery module 220 is capable of being flipped inside the flipping device and transferred from the first supporting member 210 to the second supporting member 300, thereby reducing the overall footprint of the flipping and transplanting processes. The lifting mechanism 120, the flipping mechanism 130, the first clamping mechanism 140, and the second clamping mechanism 150 are respectively arranged in the through space 101, which is conducive to improving the compactness of the flipping device.

In some embodiments, referring to FIG. 5, the flipping device further includes a counterweight structure 171 and a flexible connecting element 172, and two ends of the flexible connecting element 172 are respectively connected to the counterweight structure 171 and the lifting mechanism 120. The flexible connecting element 172 is higher in the middle and lower at both ends, and at least part of the flexible connecting element 172 abuts against at least part of an upper side of the device frame 110.

The counterweight structure 171 may be set as a counterweight block, or the like, and the flexible connecting element 172 may be set as a rope, a connection belt, or the like. The flexible connecting element 172 is higher in the middle and lower at both ends, and at least part of the flexible connecting element 172 abuts against the upper side of at least part of the device frame 110, so that the counterweight structure 171 is capable of offsetting at least part of the weight of the lifting mechanism 120, as well as the flipping mechanism 130, the first clamping mechanism 140, the second clamping mechanism 150, the first supporting member 210, and the battery module 220 that are located on the lifting mechanism 120.

In the embodiment, the counterweight structure 171 is capable of reducing a driving torque of the lifting drive apparatus 121 by the flexible connecting element 172, which is conducive to improving the lifting efficiency and lifting stability of the battery module 220 on the lifting mechanism 120.

In some embodiments, the counterweight structure 171 and the flexible connecting element 172 are arranged on one side of the device frame 110 where the rack 122 is arranged, so that the counterweight structure 171 and the flexible connecting element 172 are relatively close to the rack 122, thereby reducing impact torques of the counterweight structure 171 and the flexible connecting element 172 on the rack 122 when starting the lifting, and improving the fatigue life of transmission structures such as the rack 122 and the gear under repeated use.

In some embodiments, referring to FIG. 5, the device frame 110 includes an upper connecting frame 111, a lower connecting frame 112, and at least two connecting columns 113. The upper connecting frame 111 and the lower connecting frame 112 are arranged opposite to each other in the vertical direction, and two ends of the connecting columns 113 are respectively connected to the upper connecting frame 111 and the lower connecting frame 112. The upper connecting frame 111, the lower connecting frame 112, and the connecting columns 113 form the through space 101, and part of the upper connecting frame 111 abuts under the flexible connecting element 172.

The upper connecting frame 111 may be understood as a hollow connection structure located on the upper side, the lower connecting frame 112 may be understood as a hollow connection structure located on the lower side, and the connecting column 113 may be understood as an overall relatively upright column connecting the upper connecting frame 111 and the lower connecting frame 112.

In the embodiment, the device frame 110 includes the upper connecting frame 111, the lower connecting frame 112, and the at least two connecting columns 113, which is conducive to reducing material consumption and is capable of increasing activity space for other components such as the flexible connecting element 172 and the conveying line 160, thereby being conducive to improving space utilization of the flipping device.

In some embodiments, the flipping mechanism 130 is configured to flip the lifted to-be-flipped member 200 in a first rotational direction. The flipping mechanism 130 is further configured to flip the lifted first supporting member 210 in a second rotational direction after the second supporting member 300 carries the battery module 220, and the second rotational direction is opposite to the first rotational direction. For example, the first rotational direction may be set to a clockwise direction, and the second rotational direction may be set to a counterclockwise direction.

In the embodiment, the flipping mechanism 130 is configured to flip the lifted to-be-flipped member 200 in the first rotational direction, and is further configured to flip the lifted first supporting member 210 in the second rotational direction after the second supporting member 300 carries the battery module 220, the second rotational direction being opposite to the first rotational direction, which is capable of reducing the risk of entanglement between the connecting pipelines of mechanisms such as the first clamping mechanism 140 and the second clamping mechanism 150 and structures such as the counterweight structure 171 and the lower connecting frame 112, thereby reducing the risk of unstable flipping caused by entanglement of pipelines. The device frame 110 itself has a high structural stability, the lifting mechanism 120 is lifted and lowered more smoothly, and the flipping mechanism 130 is flipped more smoothly and capable of promoting each other, which reduces structures such as diagonal braces required when the device frame 110 is connected to the work site and has a high structural compactness, thereby reducing the occupied space.

Figure 6:
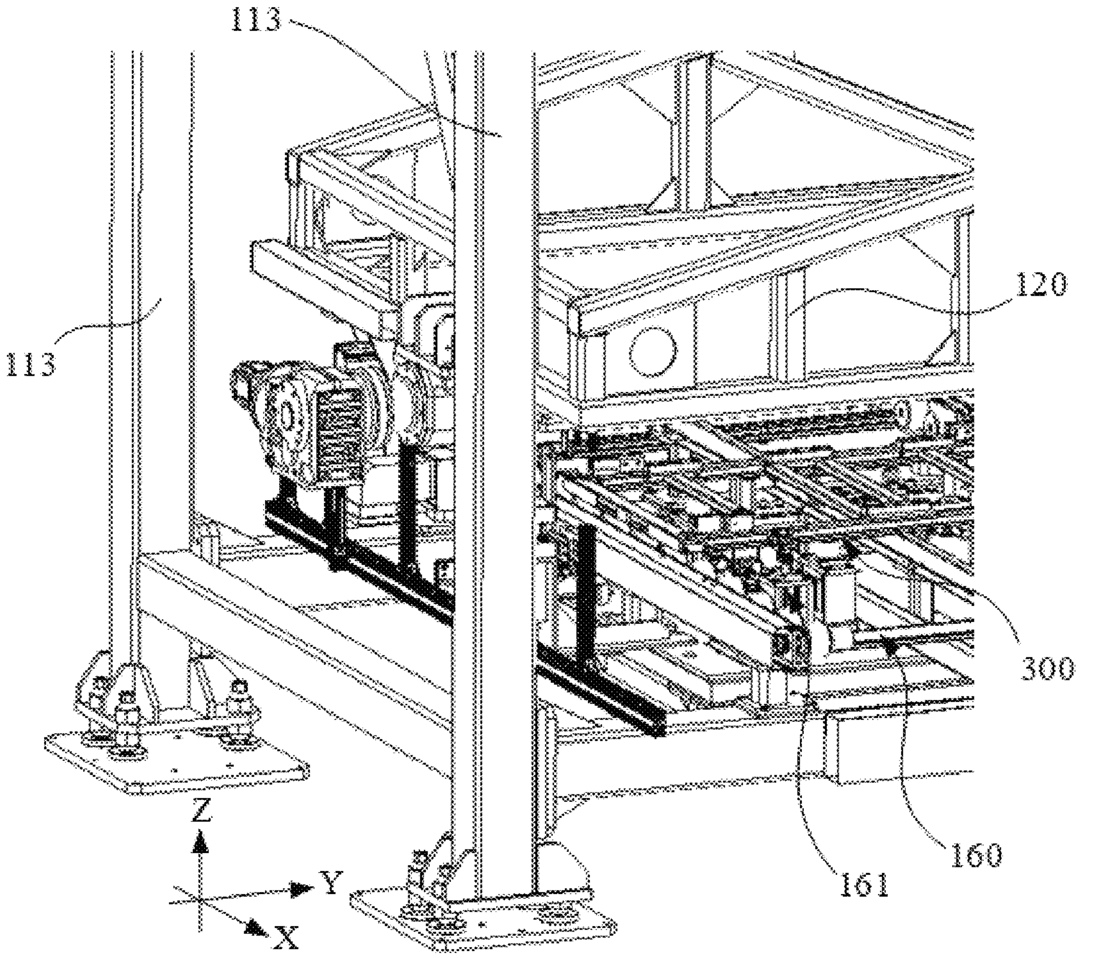
FIG. 6 is another schematic partial structural diagram of an embodiment of a flipping device according to the present application.

In some embodiments, referring to FIG. 6, the flipping device further includes a blocking mechanism 161, the blocking mechanism 161 is configured to block the to-be-flipped member 200 located on the conveying line 160 or to block the second supporting member 300 located on the conveying line 160, and the blocking mechanism 161 can be lifted and lowered relative to the conveying line 160.

The blocking mechanism 161 may be set as a telescopic mechanism such as a telescopic cylinder and an electric telescopic rod, so as to block the to-be-flipped member 200 or the second supporting member 300 located on the conveying line 160 by extending out of an upper surface of the conveying line 160, and allow the second supporting member 300 and other structures to pass through by retracting to below the upper surface of the conveying line 160.

In the embodiment, the blocking mechanism 161 is capable of positioning the to-be-flipped member 200 or the second supporting member 300 in a conveying direction (for example, the direction X in the figure), which reduces the risk of the to-be-flipped member 200 or the second supporting member 300 being conveyed beyond a preset position, thereby being conducive to improving the position accuracy of gripping the to-be-flipped member 200 or placing the battery module 220 on the second supporting member 300.

Figure 7:
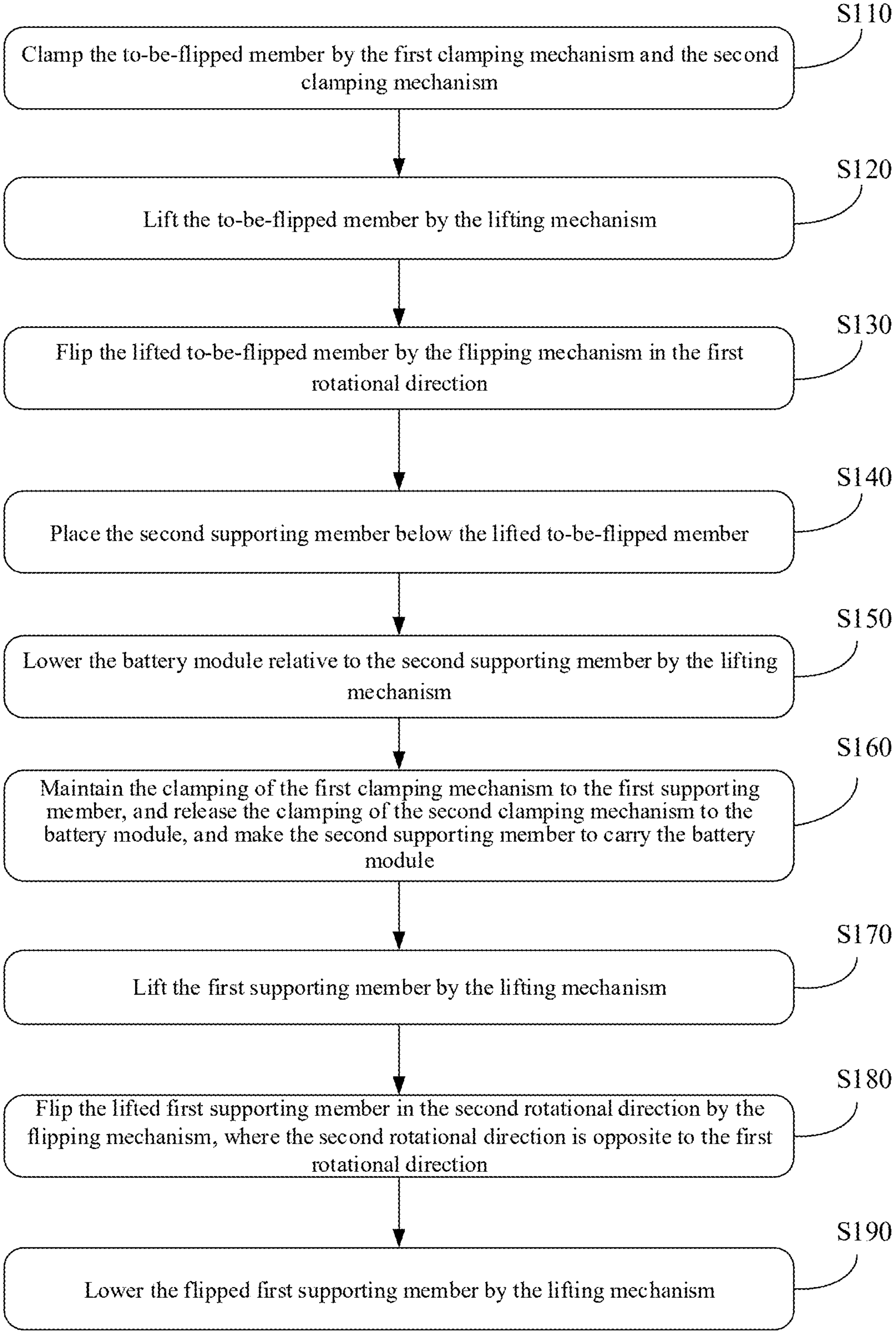
FIG. 7 is a schematic flowchart of an embodiment of a use method of a flipping device according to the present application.

Correspondingly, the present application further proposes a use method of a flipping device, and the use method is applied to the above flipping device. Referring to FIG. 7, the use method includes the following steps:

Step S110: Clamp the to-be-flipped member 200 by the first clamping mechanism 140 and the second clamping mechanism 150;

Step S120: Lift the to-be-flipped member 200 by the lifting mechanism 120;

Step S130: Flip the lifted to-be-flipped member 200 by the flipping mechanism 130; specifically, it may be configured to flip the lifted to-be-flipped member 200 in the first rotational direction by the flipping mechanism 130;

Step S140: Place the second supporting member 300 below the lifted to-be-flipped member 200, for example, place the second supporting member 300 on the conveying line 160;

Step S150: Lower the battery module 220 relative to the second supporting member 300 by the lifting mechanism 120; and Step S160: Maintain the clamping of the first clamping mechanism 140 to the first supporting member 210, and release the clamping of the second clamping mechanism 150 to the battery module 220, so that the second supporting member 300 carries the battery module 220.

When the flipping device is used according to the use method of the present application, the flipping device is capable of first lifting and then flipping the to-be-flipped member 200 including the battery module 220 by the lifting mechanism 120 and the flipping mechanism 130, which is conducive to reducing the risk of the to-be-flipped member 200 colliding with the device frame 110 or the conveying line 160 in the flipping process. The clamping of the first clamping mechanism 140 to the first supporting member 210 is maintained and the clamping of the second clamping mechanism 150 to the battery module 220 is released, which is conducive to flipping and resetting the first supporting member 210 while conveying the battery module 220 and the second supporting member 300 by the conveying line 160, thereby being conducive to improving the flipping efficiency.

In some embodiments, after the step of maintaining the clamping of the first clamping mechanism 140 to the first supporting member 210 and releasing the clamping of the second clamping mechanism 150 to the battery module 220, so that the second supporting member 300 carries the battery module 220, referring to FIG. 7, the use method further includes the following steps:

Step S170: Lift the first supporting member 210 by the lifting mechanism 120;

Step S180: Flip the lifted first supporting member 210 in the second rotational direction by the flipping mechanism 130, the second rotational direction being opposite to the first rotational direction; for example, the first rotational direction may be set to a clockwise direction, and the second rotational direction may be set to a counterclockwise direction; and Step S190: Lower the flipped first supporting member 210 by the lifting mechanism 120.

When the flipping device is used according to the use method, the lifted to-be-flipped member 200 is flipped in the first rotational direction, and the lifted first supporting member 210 is flipped in the second rotational direction, the second rotational direction being opposite to the first rotational direction, which is capable of reducing the risk of entanglement of the connecting pipelines, thereby reducing the risk of unstable flipping caused by entanglement of pipelines, being conducive to reducing the structures such as the diagonal braces required when the corresponding device frame 110 is connected to the work site, and being conducive to reducing the occupied space.

In addition, the first supporting member 210 is capable of being flipped and reset after the battery module 220 is detached, and the first supporting member 210 is capable of continuing to be configured to carry a new battery module 220, which is conducive to improving the use efficiency of the first supporting member 210. Moreover, the second rotational direction is opposite to the first rotational direction, which is conducive to reducing a cumulative error of the flipping process and improving the repeated position accuracy of the flipping process.

Figure 8:
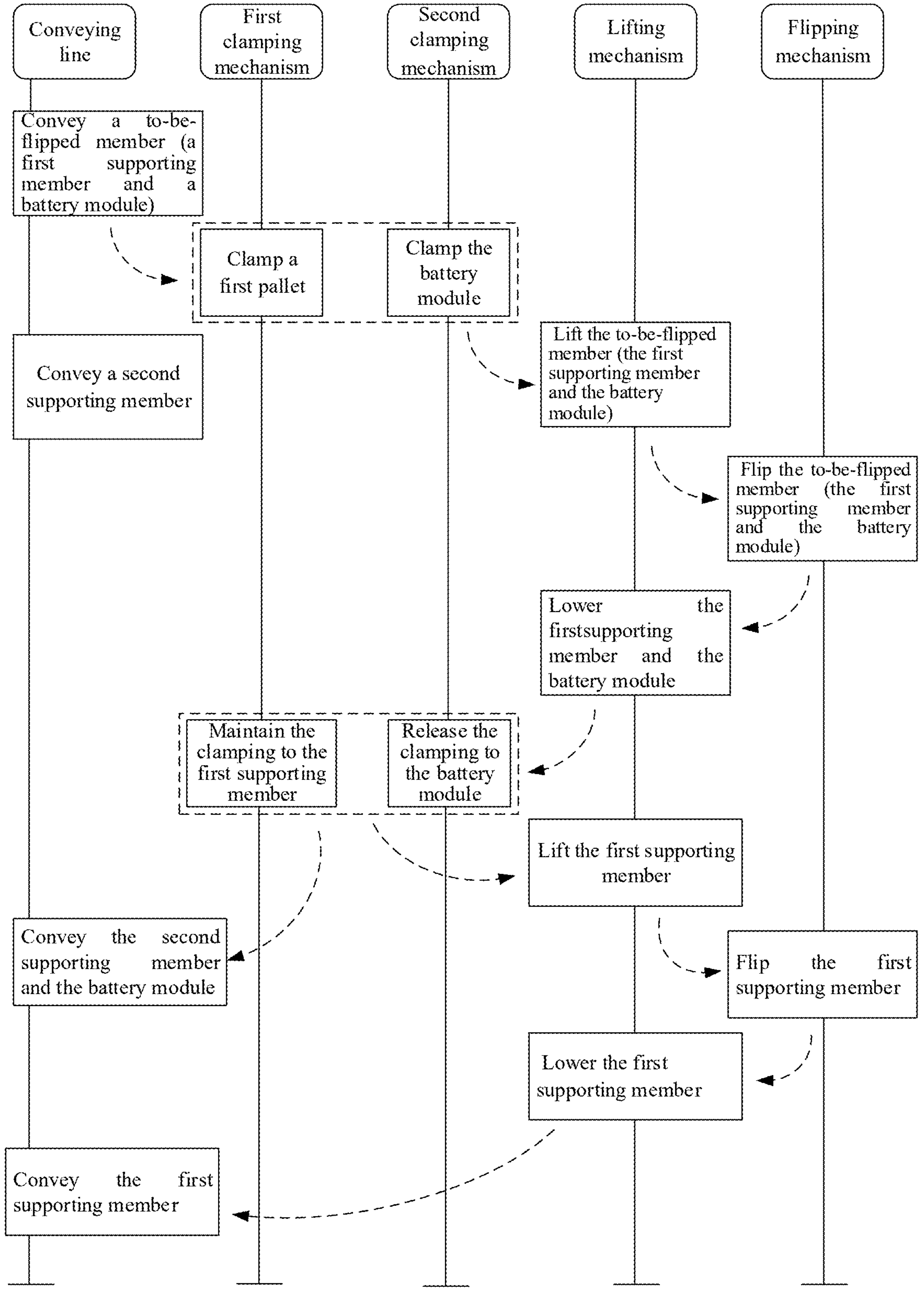
FIG. 8 is a schematic flowchart of another embodiment of a use method of a flipping device according to the present application.

In some embodiments, referring to FIG. 8, the step of lowering the battery module 220 relative to the second supporting member 300 includes:

lowering the battery module 220 and the first supporting member 210 synchronously relative to the second supporting member 300.

In the embodiment, the battery module 220 and the first supporting member 210 are lowered synchronously relative to the second supporting member 300, which is conducive to reducing the complexity of the process of lowering the battery module 220 and the first supporting member 210.

In some embodiments, referring to FIG. 8, after the step of maintaining the clamping of the first clamping mechanism 140 to the first supporting member 210 and releasing the clamping of the second clamping mechanism 150 to the battery module 220, so that the second supporting member 300 carries the battery module 220, the use method further includes the following steps:

lifting the first supporting member 210 by the lifting mechanism 120;

flipping the lifted first supporting member 210 by the flipping mechanism 130; and lowering the flipped first supporting member 210 by the lifting mechanism 120.

In the embodiment, the first supporting member 210 is capable of being flipped and reset after the battery module 220 is detached, and the first supporting member 210 is capable of continuing to be configured to carry a new battery module 220, which is conducive to improving the use efficiency of the first supporting member 210.

In some embodiments, referring to FIG. 8, the step of flipping the lifted to-be-flipped member 200 includes: flipping the lifted to-be-flipped member 200 in the first rotational direction; and the step of flipping the lifted first supporting member 210 includes: flipping the lifted first supporting member 210 in the second rotational direction, where the second rotational direction is opposite to the first rotational direction. For example, the first rotational direction may be set to a clockwise direction, and the second rotational direction may be set to a counterclockwise direction.

In the embodiment, the second rotational direction is opposite to the first rotational direction, which is conducive to reducing a cumulative error of the flipping process and improving the repeated position accuracy of the flipping process.

Figure 9:
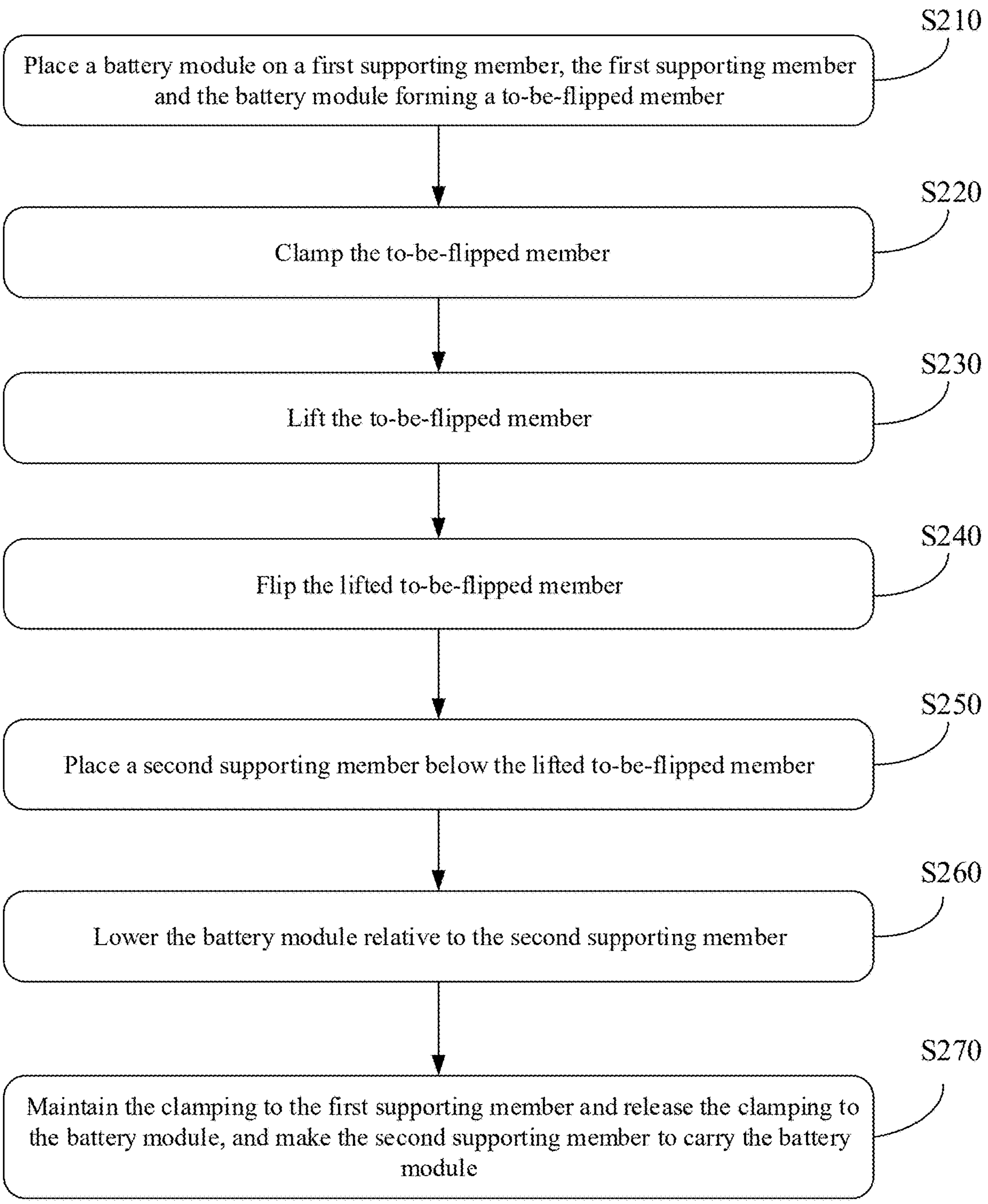
FIG. 9 is a schematic flowchart of an embodiment of a flipping method for a battery module according to the present application.

The present application further proposes a flipping method for a battery module, referring to FIG. 9, the flipping method may be applied to the above flipping device, and the flipping method includes the following steps:

Step S210: Place the battery module 220 on the first supporting member 210, where the first supporting member 210 and the battery module 220 form the to-be-flipped member 200;

Step S220: Clamp the to-be-flipped member 200;

Step S230: Lift the to-be-flipped member 200;

Step S240: Flip the lifted to-be-flipped member 200;

Step S250: Place the second supporting member 300 below the lifted to-be-flipped member 200;

Step S260: Lower the battery module 220 relative to the second supporting member 300; and Step S270: Maintain the clamping to the first supporting member 210, and release the clamping to the battery module 220, so that the second supporting member 300 carries the battery module 220.

When the battery module 220 is flipped by using the flipping method according to the present application, it is capable of being conducive to reducing the risk of unstable flipping caused by entanglement of pipelines, being conducive to reducing the structures such as the diagonal braces required when the corresponding device frame 110 is connected to the work site, and being conducive to reducing the occupied space. In addition, the clamping to the first supporting member 210 is maintained and the clamping to the battery module 220 is released, and the second supporting member 300 carries the battery module 220, which is conducive to flipping and resetting the first supporting member 210 while the battery module 220 and the second supporting member 300 are conveyed through a conveying line 160, thereby being conducive to improving the flipping efficiency.

Referring to FIG. 1 to FIG. 6, in one embodiment of the present application, the flipping device includes a device frame 110, a lifting mechanism 120, a flipping mechanism 130, a first clamping mechanism 140, and a second clamping mechanism 150. At least part of the device frame 110 is configured to be arranged beside a conveying line 160. The conveying line 160 is configured to convey a to-be-flipped member 200. The to-be-flipped member 200 includes a first supporting member 210 and a battery module 220 placed on the first supporting member 210. The conveying line 160 is further configured to convey a second supporting member 300 to below the to-be-flipped member 200 after the to-be-flipped member 200 is lifted. The lifting mechanism 120 can be lifted and lowered relative to the device frame 110. The flipping mechanism 130 is rotatably connected to the lifting mechanism 120. The first clamping mechanism 140 is arranged on the flipping mechanism 130, and the first clamping mechanism 140 is configured to clamp the first supporting member 210. The second clamping mechanism 150 is arranged on the flipping mechanism 130, the second clamping mechanism 150 is configured to clamp the battery module 220, and the second clamping mechanism 150 is configured to release the clamping to the battery module 220 independently of the first clamping mechanism 140. The flipping mechanism 130 is configured to flip the lifted to-be-flipped member 200 in a first rotational direction. The flipping mechanism 130 is further configured to flip the lifted first supporting member 210 in a second rotational direction after the second supporting member 300 carries the battery module 220, and the second rotational direction is opposite to the first rotational direction. The flipping mechanism 130 includes a flipping drive mechanism 131 and a driven mechanism 132 which are arranged at an interval. The flipping drive mechanism 131 and the driven mechanism 132 are respectively rotatably connected to the lifting mechanism 120, and the rotation axis of the flipping drive mechanism 131 is colinear with the rotation axis of the driven mechanism 132. The first clamping mechanism 140 includes a first clamping assembly 141 and a second clamping assembly 142, the first clamping assembly 141 and the second clamping assembly 142 are arranged at an interval in the first direction, and the first direction is parallel to the flipping plane of the flipping mechanism 130. The second clamping mechanism 150 includes a third clamping assembly 151 and a fourth clamping assembly 152, the third clamping assembly 151 and the fourth clamping assembly 152 are arranged in the second direction, and the second direction is parallel to the flipping axis of the flipping mechanism 130. The device frame 110 is provided with a rack 122, and the rack 122 is arranged to extend in the vertical direction. The lifting mechanism 120 includes a lifting drive apparatus 121 and a gear, an output shaft of the lifting drive apparatus 121 is connected to the gear, and the gear is meshed with the rack 122. Two sets of racks 122, gears, and lifting drive apparatuses 121 are arranged at an interval in a direction parallel to the flipping plane of the flipping mechanism 130. The rotation axis A of the flipping mechanism 130 is arranged between the two racks 122, and an extension direction of connecting teeth of the racks 122 is parallel to the flipping plane of the flipping mechanism 130. The flipping drive mechanism 131 is arranged on one side away from the rack 122, and the driven mechanism 132 is arranged on one side facing the rack 122. The flipping device further includes the conveying line 160. The device frame 110 has a through space 101 that penetrates the device frame 110 in the horizontal direction. The conveying line 160 passes through the through space 101 in the horizontal direction. The lifting mechanism 120, the flipping mechanism 130, the first clamping mechanism 140, and the second clamping mechanism 150 are respectively arranged in the through space 101. The flipping device further includes a counterweight structure 171 and a flexible connecting element 172, and two ends of the flexible connecting element 172 are respectively connected to the counterweight structure 171 and the lifting mechanism 120. The flexible connecting element 172 is higher in the middle and lower at both ends, and at least part of the flexible connecting element 172 abuts against at least part of an upper side of the device frame 110. The counterweight structure 171 and the flexible connecting element 172 are arranged on one side of the device frame 110 where the rack 122 is arranged. The device frame 110 includes an upper connecting frame 111, a lower connecting frame 112, and at least two connecting columns 113. The upper connecting frame 111 and the lower connecting frame 112 are arranged opposite to each other in the vertical direction, and two ends of the connecting columns 113 are respectively connected to the upper connecting frame 111 and the lower connecting frame 112. The upper connecting frame 111, the lower connecting frame 112, and the connecting columns 113 form the through space 101, and part of the upper connecting frame 111 abuts under the flexible connecting element 172. The flipping device further includes a conveying line 160 and a blocking mechanism 161, the blocking mechanism 161 is configured to block the to-be-flipped member 200 located on the conveying line 160 or to block the second supporting member 300 located on the conveying line 160, and the blocking mechanism 161 can be lifted and lowered relative to the conveying line 160.

Referring to FIG. 8, in one embodiment of the present application, the use method of a flipping device is applied to the flipping device described above, and the use method includes the following steps:

clamping the to-be-flipped member 200 by the first clamping mechanism 140 and the second clamping mechanism 150;

lifting the to-be-flipped member 200 by the lifting mechanism 120;

flipping the lifted to-be-flipped member 200 by the flipping mechanism 130;

placing the second supporting member 300 below the lifted to-be-flipped member 200;

lowering the battery module 220 relative to the second supporting member 300 by the lifting mechanism 120; and maintaining the clamping of the first clamping mechanism 140 to the first supporting member 210, and releasing the clamping of the second clamping mechanism 150 to the battery module 220, so that the second supporting member 300 carries the battery module 220.

The step of lowering the battery module 220 relative to the second supporting member 300 includes:

lowering the battery module 220 and the first supporting member 210 synchronously relative to the second supporting member 300.

After the step of maintaining the clamping of the first clamping mechanism 140 to the first supporting member 210 and releasing the clamping of the second clamping mechanism 150 to the battery module 220, so that the second supporting member 300 carries the battery module 220, the use method further includes the following steps:

lifting the first supporting member 210 by the lifting mechanism 120;

flipping the lifted first supporting member 210 by the flipping mechanism 130; and lowering the flipped first supporting member 210 by the lifting mechanism 120.

The step of flipping the lifted to-be-flipped member 200 includes: flipping the lifted to-be-flipped member 200 in the first rotational direction; and the step of flipping the lifted first supporting member 210 includes: flipping the lifted first supporting member 210 in the second rotational direction, where the second rotational direction is opposite to the first rotational direction.

The foregoing descriptions are merely some preferred embodiments of the present application, but are not intended to limit the patent scope of the present application. Any equivalent structural transformations or equivalent process transformations made under the inventive concept of the present application by using the content of the specification and accompanying drawings, or direct/indirect application of the content of the specification and accompanying drawings to other related technical fields should fall within the patent protection scope of the present application.

What is claimed is:

1. A flipping device, comprising:

a device frame, wherein at least part of the device frame is configured to be arranged beside a conveying line, the conveying line is configured to convey a to-be-flipped member, the to-be-flipped member comprises a first supporting member and a battery module placed on the first supporting member, and the conveying line is further configured to convey a second supporting member to below the to-be-flipped member after the to-be-flipped member is lifted;

a lifting mechanism, wherein the lifting mechanism is capable of being lifted and lowered relative to the device frame;

a flipping mechanism, wherein the flipping mechanism is rotatably connected to the lifting mechanism and comprises a flipping drive mechanism and a driven mechanism arranged at an interval, the flipping drive mechanism and the driven mechanism are respectively rotatably connected to the lifting mechanism, and a rotation axis of the flipping drive mechanism is colinear with a rotation axis of the driven mechanism;

a first clamping mechanism, wherein the first clamping mechanism is arranged on the flipping mechanism and the first clamping mechanism is configured to clamp the first supporting member; and a second clamping mechanism, wherein the second clamping mechanism is arranged on the flipping mechanism, the second clamping mechanism is configured to clamp the battery module, and the second clamping mechanism is configured to release the clamping to the battery module independently of the first clamping mechanism.

2. The flipping device according to claim 1, wherein the first clamping mechanism comprises a first clamping assembly and a second clamping assembly, the first clamping assembly and the second clamping assembly are arranged at an interval in a first direction, the first direction is parallel to a flipping plane of the flipping mechanism, and the first clamping assembly and the second clamping assembly are respectively configured to clamp two opposite sides of the first supporting member in a height direction.

3. The flipping device according to claim 1, wherein the second clamping mechanism comprises a third clamping assembly and a fourth clamping assembly, the third clamping assembly and the fourth clamping assembly are arranged in a second direction, and the second direction is parallel to a flipping axis of the flipping mechanism.

4. The flipping device according to claim 1, wherein:

the device frame is provided with a rack, and the rack is arranged to extend in a vertical direction; and the lifting mechanism comprises a lifting drive apparatus.

5. The flipping device according to claim 4, wherein:

the flipping drive mechanism is arranged on one side away from the rack; and the driven mechanism is arranged on one side facing the rack, and spaced apart from the flipping drive mechanism.

6. The flipping device according to claim 1, further comprising:

the conveying line;

wherein:

the device frame has a through space that penetrates the device frame in a horizontal direction, and the conveying line passes through the through space in the horizontal direction; and the lifting mechanism, the flipping mechanism, the first clamping mechanism, and the second clamping mechanism are respectively arranged in the through space.

7. The flipping device according to claim 1, further comprising:

a counterweight structure; and a flexible connecting element;

wherein:

two ends of the flexible connecting element are respectively connected to the counterweight structure and the lifting mechanism;

the flexible connecting element is higher in the middle and lower at both ends; and at least part of the flexible connecting element abuts against at least part of an upper side of the device frame.

8. The flipping device according to claim 7, wherein:

the device frame is provided with a rack; and the counterweight structure and the flexible connecting element are arranged on one side of the device frame where the rack is arranged.

9. The flipping device according to claim 7, wherein:

the device frame comprises an upper connecting frame, a lower connecting frame, and at least two connecting columns, the upper connecting frame and the lower connecting frame are arranged opposite to each other in the vertical direction, and two ends of the connecting columns are respectively connected to the upper connecting frame and the lower connecting frame; and the upper connecting frame, the lower connecting frame, and the connecting columns form a through space, and part of the upper connecting frame abuts under the flexible connecting element.

10. The flipping device according to claim 1, further comprising:

the conveying line; and a blocking mechanism, configured to block the to-be-flipped member located on the conveying line or to block the second supporting member located on the conveying line, and the blocking mechanism being capable of being lifted and lowered relative to the conveying line.

11. The flipping device according to claim 1, wherein the flipping mechanism is configured to:

flip the lifted to-be-flipped member in a first rotational direction; and flip the lifted first supporting member in a second rotational direction after the second supporting member carries the battery module, the second rotational direction being opposite to the first rotational direction.

12. A method of operating the flipping device according to claim 1, comprising:

clamping the to-be-flipped member by the first clamping mechanism and the second clamping mechanism;

lifting the to-be-flipped member by the lifting mechanism;

flipping the lifted to-be-flipped member by the flipping mechanism in the first rotational direction;

placing the second supporting member below the lifted to-be-flipped member;

lowering the battery module relative to the second supporting member by the lifting mechanism; and maintaining the clamping of the first clamping mechanism to the first supporting member and releasing the clamping of the second clamping mechanism to the battery module, and making the second supporting member to carry the battery module.

13. The method according to claim 12, wherein lowering the battery module relative to the second supporting member comprises:

lowering the battery module and the first supporting member synchronously relative to the second supporting member.

14. The method according to claim 12, further comprising, after maintaining the clamping of the first clamping mechanism to the first supporting member and releasing the clamping of the second clamping mechanism to the battery module, and making the second supporting member to carry the battery module:

lifting the first supporting member by the lifting mechanism;

flipping the lifted first supporting member by the flipping mechanism; and lowering the flipped first supporting member by the lifting mechanism.

15. The method according to claim 14, wherein:

flipping the lifted to-be-flipped member comprises: flipping the lifted to-be-flipped member in the first rotational direction; and flipping the lifted first supporting member includes: flipping the lifted first supporting member in the second rotational direction, wherein the second rotational direction is opposite to the first rotational direction.

16. A flipping method for a battery module, comprising:

placing the battery module on a first supporting member, wherein the first supporting member and the battery module form a to-be-flipped member;

clamping the to-be-flipped member;

lifting the to-be-flipped member using a lifting mechanism;

flipping the lifted to-be-flipped member using a flipping mechanism rotatably connected to the lifting mechanism and comprising a flipping drive mechanism and a driven mechanism arranged at an interval, the flipping drive mechanism and the driven mechanism being respectively rotatably connected to the lifting mechanism, and a rotation axis of the flipping drive mechanism being colinear with a rotation axis of the driven mechanism;

placing a second supporting member below the lifted to-be-flipped member;

lowering the battery module relative to the second supporting member; and maintaining the clamping to the first supporting member and releasing the clamping to the battery module, and making the second supporting member to carry the battery module.

17. A flipping device, comprising:

a device frame, wherein at least part of the device frame is configured to be arranged beside a conveying line, the conveying line is configured to convey a to-be-flipped member, the to-be-flipped member comprises a first supporting member and a battery module placed on the first supporting member, and the conveying line is further configured to convey a second supporting member to below the to-be-flipped member after the to-be-flipped member is lifted;

a blocking mechanism, configured to block the to-be-flipped member located on the conveying line or to block the second supporting member located on the conveying line, and the blocking mechanism being capable of being lifted and lowered relative to the conveying line;

a lifting mechanism, wherein the lifting mechanism is capable of being lifted and lowered relative to the device frame;

a flipping mechanism, wherein the flipping mechanism is rotatably connected to the lifting mechanism;

a first clamping mechanism, wherein the first clamping mechanism is arranged on the flipping mechanism and the first clamping mechanism is configured to clamp the first supporting member; and a second clamping mechanism, wherein the second clamping mechanism is arranged on the flipping mechanism, the second clamping mechanism is configured to clamp the battery module and release the clamping to the battery module independently of the first clamping mechanism, the second clamping mechanism comprises a third clamping assembly and a fourth clamping assembly, the third clamping assembly and the fourth clamping assembly are arranged in a second direction, and the second direction is parallel to a flipping axis of the flipping mechanism.

* * * * *